US007523391B1

(12) United States Patent
Eizenhoefer

(10) Patent No.: US 7,523,391 B1
(45) Date of Patent: Apr. 21, 2009

(54) INDICATING CHANGE TO DATA FORM

(75) Inventor: Richard Scott Eizenhoefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 10/397,098

(22) Filed: Mar. 25, 2003

(51) Int. Cl.
*G06F 17/00* (2006.01)
*G06F 3/00* (2006.01)

(52) U.S. Cl. .................. 715/224; 715/255; 715/859; 707/100; 709/203

(58) Field of Classification Search .............. 715/507, 715/517, 530, 511, 200, 205, 224, 221, 225, 715/226, 234, 250, 255, 700, 701, 702, 711, 715/713, 715, 760, 763, 767, 772, 780, 800, 715/801, 802, 808, 815, 817, 856, 857, 858, 715/859; 707/1, 3, 10, 104.1, 200; 709/203
See application file for complete search history.

(56) References Cited

U.S. PATENT DOCUMENTS

| 5,047,959 | A | * | 9/1991 | Phillips et al. .............. 715/853 |
| 5,317,730 | A |   | 5/1994 | Moore et al. ................ 395/600 |
| 5,345,553 | A | * | 9/1994 | Busboom et al. ............ 715/744 |
| 5,640,501 | A | * | 6/1997 | Turpin ........................ 715/507 |
| 5,694,608 | A | * | 12/1997 | Shostak ....................... 715/236 |
| 5,714,978 | A | * | 2/1998 | Yamanaka et al. .......... 345/157 |
| 5,742,836 | A | * | 4/1998 | Turpin et al. ................ 715/507 |
| 5,745,712 | A | * | 4/1998 | Turpin et al. ................ 715/763 |
| 5,892,510 | A | * | 4/1999 | Lau et al. .................... 715/866 |
| 6,046,726 | A | * | 4/2000 | Keyson ....................... 345/156 |
| 6,084,585 | A | * | 7/2000 | Kraft et al. .................. 715/733 |
| 6,272,506 | B1 | * | 8/2001 | Bell ............................ 715/507 |
| 6,286,001 | B1 | * | 9/2001 | Walker et al. ................ 707/9 |
| 6,344,791 | B1 | * | 2/2002 | Armstrong ................... 338/114 |
| 6,393,419 | B1 | * | 5/2002 | Novak et al. ................. 707/8 |
| 6,418,471 | B1 | * | 7/2002 | Shelton et al. .............. 709/227 |
| 6,469,692 | B2 | * | 10/2002 | Rosenberg .................. 345/161 |
| 6,473,069 | B1 | * | 10/2002 | Gerpheide ................... 345/157 |
| 6,499,114 | B1 | * | 12/2002 | Almstead et al. ............. 714/25 |

(Continued)

OTHER PUBLICATIONS

Cobena et al., "Detecting Changes in XML Document", IEEE, Feb. 26-Mar. 1, 2002, pp. 1-12.*

(Continued)

*Primary Examiner*—Doug Hutton
*Assistant Examiner*—Maikhanh Nguyen
(74) *Attorney, Agent, or Firm*—Workman Nydegger

(57) ABSTRACT

Indicating a change to a data field in an electronic data entry form, such as a Web page, database form, or other electronic form. Upon loading an electronic data entry form, an initial content of each data field is stored. User interaction with a data field is detected, and the current content of the data field is compared to the initial content. If the content changes from its initial content, an indicator associated with the changed data field is activated. The indicator may include an icon displayed adjacent to the data field, a change in data field border, font, color, or other sensory characteristic. If a nested data field is modified, a second indicator may be activated for the nested data field. Any indicator may be deactivated if a reset function is activated, or the new data is submitted to a server or database for further action or permanent storage.

13 Claims, 4 Drawing Sheets

U.S. PATENT DOCUMENTS

| | | | |
|---|---|---|---|
| 6,691,281 B1 * | 2/2004 | Sorge et al. | 715/503 |
| 6,700,591 B1 * | 3/2004 | Sharpe | 715/762 |
| 6,967,642 B2 * | 11/2005 | SanGiovanni | 715/702 |
| 7,039,874 B2 * | 5/2006 | Pickering et al. | 715/760 |
| 7,051,031 B2 * | 5/2006 | Schein | 707/10 |
| 7,051,084 B1 * | 5/2006 | Hayton et al. | 709/219 |
| 7,058,663 B2 * | 6/2006 | Johnston et al. | 707/200 |
| 7,136,045 B2 * | 11/2006 | Rosenberg et al. | 345/163 |
| 2002/0133509 A1 * | 9/2002 | Johnston et al. | 707/203 |
| 2002/0166118 A1 * | 11/2002 | Kovan et al. | 725/1 |

OTHER PUBLICATIONS

Bhowmick et al., "Detecting and Representing Relevant Web Deltas using Web Join", IEEE, Apr. 2000, pp. 1-8.*

Tam, James et al. "Change Management." (Department of Computer Science, University of Calgary, n.d). Available http://www.geocities.com/docubase/tam.pdf.

* cited by examiner

INDICATING CHANGE TO DATA FORM

FIELD OF THE INVENTION

The present invention generally relates to indicating that a data field has been modified in a data input document such as a form, and more specifically, pertains to providing an indication of the data fields that have been modified since previous data were provided in the data input document.

BACKGROUND OF THE INVENTION

Electronic data entry forms typically include a number of data fields into which a user may enter data with a keyboard or other input device. Since the data entered into an electronic data entry form are often changed, it is common to open a form for editing with relation to a specific data record included therein. Previously entered data usually appear in data fields that a user may edit. After revisions or additions have been made to a form, it will typically not be apparent which of the data fields were revised or added.

Previous attempts to track changes in data fields have focused on maintaining an invisible temporary indicator of the status of data fields, which is used for informing a supporting database of revisions that have been made to data in the data fields. For example, Kovan et al. (U.S. Patent Application Publication No. U.S. 2002/0166118) uses two objects to store data entered into a hypertext markup language (HTML) form. A first object stores initial data values previously entered into data fields of the HTML form. A second object is copied from the first object, and a user revises data stored in the second object. The second object thereby provides a temporary current status of the data fields based on the initial content obtained from data in the original database, which are reflected in the first object. However, there is no indication to the user of the data fields that have been revised. To identify the data fields that have been changed, the user must first submit the revised HTML form to a server. A comparison is then performed between the second and first objects to determine the data fields that have current data values different from their initial data values. These differing data values are sometimes referred to as "dirty" data. The underlying database is informed of which data are dirty (i.e., which data fields were changed), but the user must rely on his or her own memory of what is observed when the results are displayed.

As another example, Moore et al. (U.S. Pat. No. 5,317,730) filters a source list of data from a permanent database through an insert list, a delete list, and a flagged list to display an "apparent" list showing the current status of changes to the source list of data. However, the user only sees the apparent list showing the current status of the data. As the user inserts data, deletes data, or flags data, the filters cause the apparent list to be updated and displayed to the user. Thus, again, there is no persistent indication to the user whether data has been inserted, deleted, or otherwise revised in the data fields.

Some application programs provide a detailed indication of a change to specific data entry. For example, in tracking revisions to a text document, a word processor can indicate an insertion of text into the document by displaying the inserted text in a different color than the text originally provided in the document. This approach is useful when more than one author edits the document, since the text inserted or changed by each author is typically shown in a different color. However, this kind of detailed indication is not useful for enabling a single user to visually determine whether he or she had already revised a data field in a data entry form. Also, the user often does not need to see the specific changes to data that were made. Instead, the user may only wish to know which data fields were previously changed, and which ones still need to be changed. While a word processor may indicate that a change was made somewhere in a line of text by simply displaying a vertical bar at a right margin next to the revised line(s) of text, this indication is not sufficiently detailed for a user to quickly identify which data was changed. A bar provides a system for indicating change to a free-form or free-flowing document, not change to discrete data fields. A bar therefore solves a different problem, wherein the bar is more of a callout to reviewers than an indicator to an author while editing. Furthermore, changes to multiple data fields may be included in a single line, and based upon a bar appearing in the margin of any line in which a change has been made, a user would not be able to determine the data fields in the line that were modified.

Although simple in concept, there is an unmet need to provide a persistent indication to a user of whether a data field has been modified. This indication would be useful in reminding the user of the position where changes in a form were made. A data field indication would also notify the user if a data field changed as a result of an unintended accidental revision. Inadvertent changes would then be easy to notice visually. Likewise, data that was intended to change, but wasn't changed, is easy to notice. For example, cut and paste operations can fail due to hitting the incorrect key combination for pasting, or attempting to pass too many characters into a field. Another example is that a user may accidentally delete data from a field while intending to copy it. Thus, an indication is needed to help the user to visually perceive data fields that were changed in an electronic data entry form or other document with data fields.

SUMMARY OF THE INVENTION

The present invention provides a method and system for indicating a change to a data field in an electronic data entry form. The data entry form may comprise a Web page, database form, or other electronic form with data fields. Upon loading an electronic data entry form, each data field is detected and an initial content of each data field is stored for future reference. As a user interacts with the data fields, the current content is compared to the initial content. User interaction with a data field may be detected by a change in focus of the data field, such as when the user moves a pointer to a different data field and clicks on the different data field. Alternatively, or in addition, a refresh button, a timer, or other detection mechanism may initiate a check for a change of content. If the content of a data field changes from its initial content, an indicator associated with the changed data field is activated. The indicator may include an icon displayed adjacent to the data field, a change in a border around the data field, a change in a font used for the current content of the data field, a change in a color of the data field, a periodic variation of intensity of a portion of the data field, or other sensory indicator.

Multiple indicators may also be employed for various levels of data fields. Some nested data fields may be dependent on higher level data fields. If a nested data field is modified, a second indicator may be activated for the nested data field. A primary or secondary indicator may be deactivated if a reset function is activated, or the new data is submitted to a server or database for further action or permanent storage. Deactivation may include overwriting a previous indicator with a blank indicator, or otherwise resetting to an initial state.

Another aspect of the invention comprises a machine readable medium storing machine instructions that cause an electronic device to provide an indicator when content is revised in a data field.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
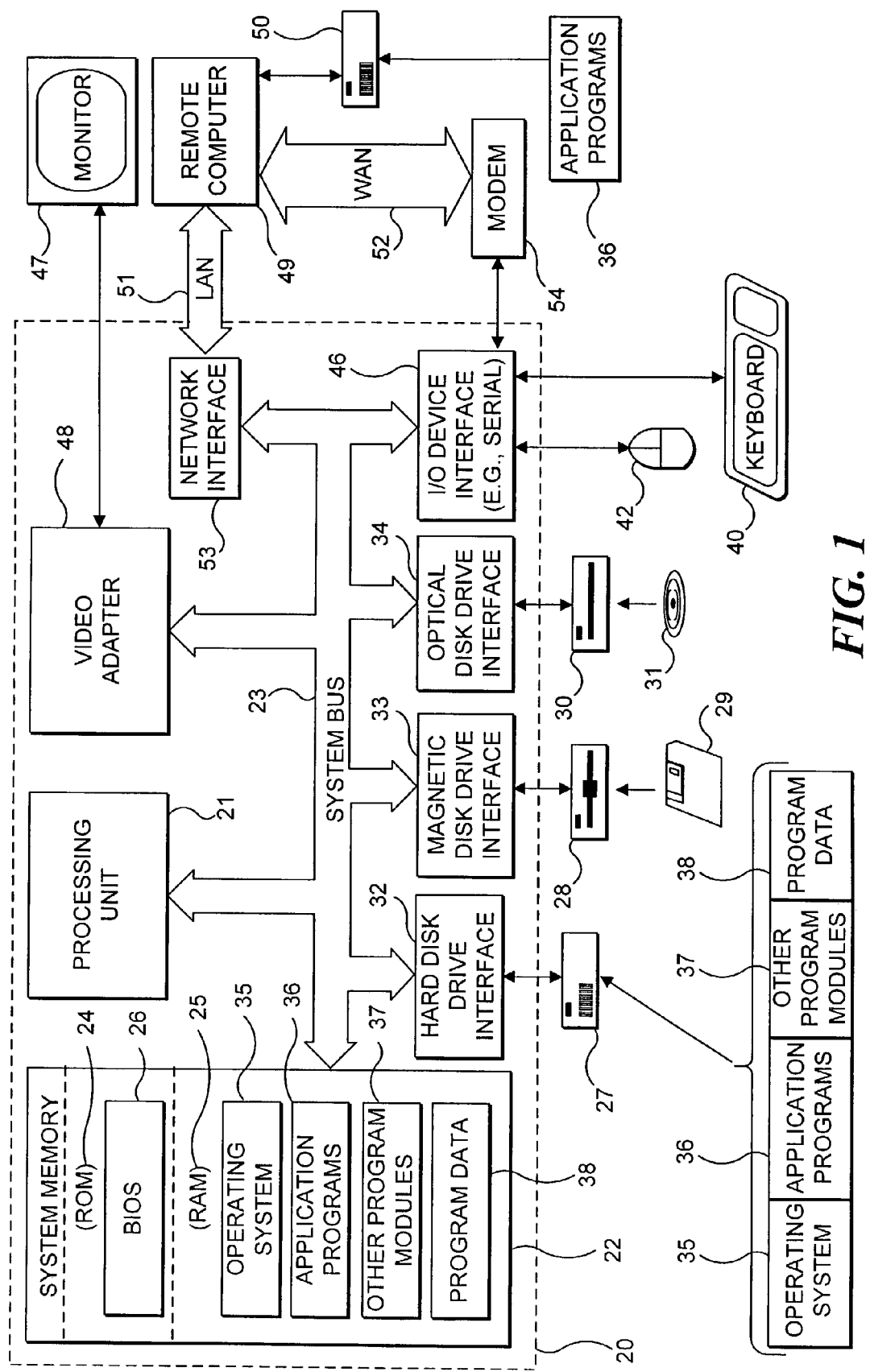
FIG. 1 is a functional block diagram of a general purpose computing device in the form of a conventional personal computer (PC) that is useful in implementing the present invention.

FIG. 1 and the following discussion are intended to provide a brief, general description of a suitable computing environment for use in implementing the present invention. Although not required, a portion of the present invention will be described in the general context of computer executable instructions, such as program modules that are executed by a PC. Generally, program modules include routines, programs, objects, components, data structures, etc. that perform particular tasks or implement particular abstract data types. Those skilled in the art will appreciate that this invention may be practiced within other computing system configurations including mainframe computers, minicomputers, multiprocessor systems, network PCs, pocket personal computing devices, game consoles, TV set-top boxes, hand held devices, peripheral devices, digital cell phones, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention comprises a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within PC 20, such as during start up, is stored in ROM 24.

PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35, one or more application programs 36, other program modules 37, and program data 38.

A user may enter commands and information into PC 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a PS/2 port, a universal serial bus (USB) port and/or other communication port. Similarly, a monitor 47 or other type of display device is also connected to system bus 23 via an appropriate interface, such as a video adapter 48, and is usable to display graphical user interfaces, images, Web pages, and/or other information. In addition to the monitor, PCs are often coupled to other peripheral output devices (not shown), such as speakers (through a sound card or other audio interface—not shown).

PC 20 may operate in a networked environment using logical connections to one or more remote sources, such as a remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. In a networked environment, program modules depicted relative to PC 20, or portions thereof, may be stored in the remote external memory storage device. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet.

Modem 54, which may be internal or external, is typically coupled directly to the system bus via an internal slot, coupled to the bus via I/O device interface 46, or coupled to the bus via network interface 53. For example, modem 54 may be a broadband modem, such as an ADSL modem, that is coupled to the system bus via a USB interface. It will be appreciated that the network connections shown are exemplary and other means of establishing a communications link between the computers may be used, such as wireless communication and wide band network links.

Exemplary Implementation of the Present Invention

Figure 2:
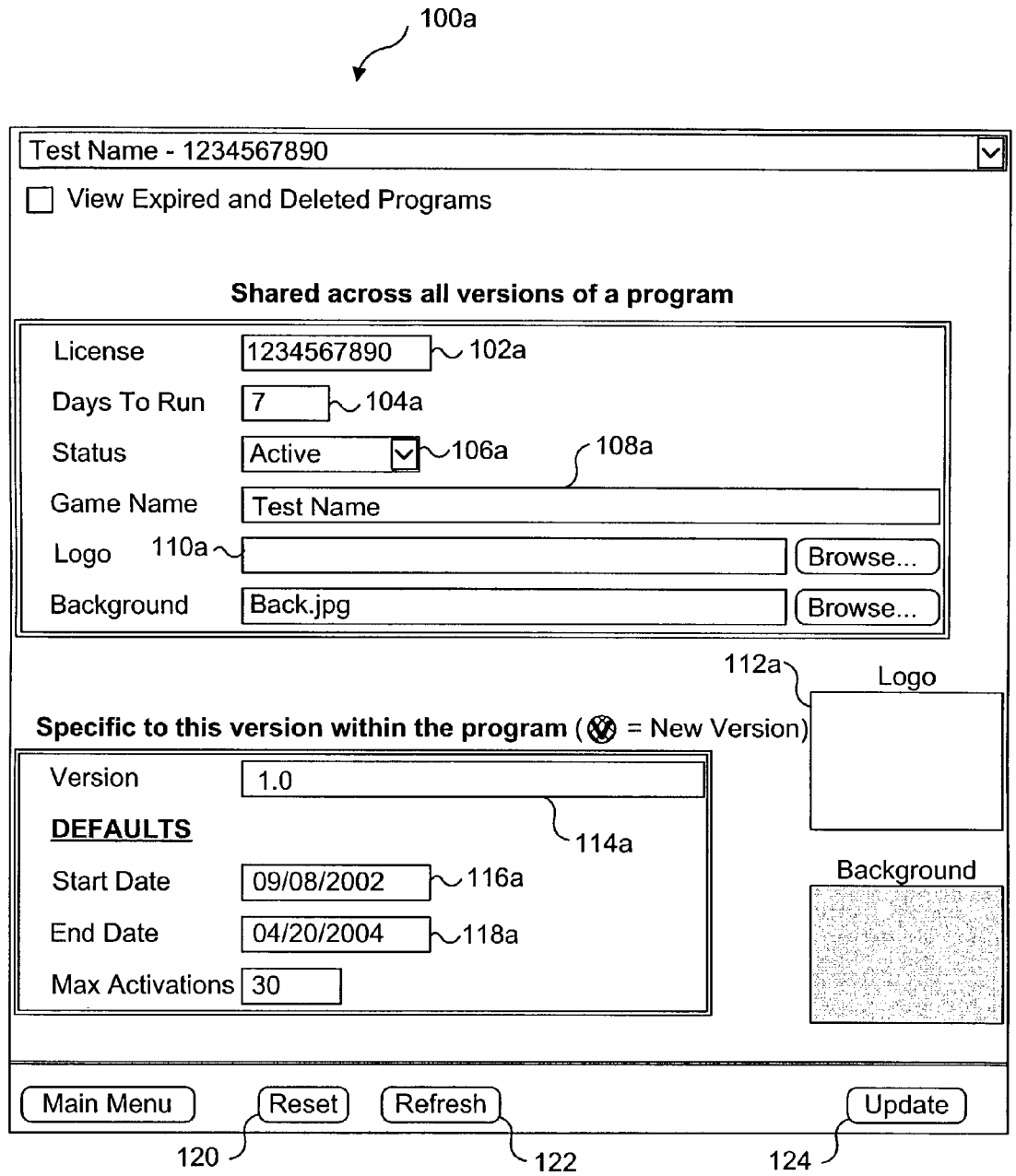
FIG. 2 is an exemplary data entry form as it initially appears prior to modification.

The embodiment described below illustrates changes to data fields of a Web page that is used as a data entry form. Those skilled in the art will recognize that the invention may be applied to forms for entering data into a database, or any other electronic data entry form with one or more data fields. FIG. 2 is an example of an initial data entry form 100a. Initial data entry form 100a includes a number of data fields into which a user may enter data, and in which data are displayed to a user. For example, a license data field 102a displays a current license number, which may provide a unique identifier for a data record. A "Days To Run" data field 104a illustrates an example of a numerical data field into which a user may enter numerical data. A status data field 106a illustrates a dropdown box with which a user may select from a list of possible status values. A game name data field 108a illustrates a text entry data field into which a user may enter text data. A logo data field 110a illustrates a browsable data field through which a user may select a file, such as an image file. The image file may be displayed as a thumbnail image 112a, providing a preview of the image file. The data entry form may also include other types of data entry fields, such as radio buttons, depress-and-hold buttons, check boxes, and other common visual data entry items.

Initial data entry form 100a may further include nested data fields to provide finer subdivisions of data associated with a record. For example, initial data entry form 100a may include a version data field 114a in which a user may specify a version number of nested data associated with the current license number. Similarly, a start date data field 116a and an end date data field 118a may be used to further define and revise the nested data.

As is common practice for editing most data fields, the user preferably clicks on a data field to enable editing of the field. This step is sometimes referred to as giving the data field "focus." Those skilled in the art will recognize that other means may be used to give the data field focus. For example, the user may advance to the data field with the keyboard, such as with a TAB key. Alternatively, the user may give a voice command to access a particular field. Other means of giving focus may include automatically advancing to the data field once a button or other control is exited, automatically advancing to the data field when a data-length limit is reached in a previous field, tracking eye movement via specialized accessibility hardware to determine a new field location, or employing other means of giving focus to a data field.

Once a data field has focus, the user revises the content of the data field. Sometimes the steps of giving the field focus and revising the content are accomplished with a single click, such as when selecting a radio button. Or, the user may enter text into the data field. In any case, when the user is satisfied with the new content, the user may click on another data field or on another portion of the data entry form which removes the focus from the data field just edited. When the change in focus occurs at the beginning of a revision or alternatively, at the completion of a revision, an indicator may be activated to show that the content of the data field has been modified.

Initial data entry form 100a also preferably includes a reset button 120 that enables a user to reset one or more modified data values back to initial data values, or zero out all data values. Those skilled in the art will recognize that reset button 120 may be applied to a single, currently selected data field, to all modified data fields, or to all data fields. Alternatively, or in addition, initial data entry form 100a may include a refresh button 122 that enables a user to refresh a display of the data entry form. In addition, or alternatively, a "show changes" button (not shown) may be available. In any case, such buttons may be useful for updating the display with indicators for the current contents of the data fields, without submitting any changes to permanent storage or for some other use. Furthermore, initial data entry form 100a preferably includes an update button 124 that enables a user to submit modified data values. The submitted modified data values may be processed to accomplish a function, may be sent to a server for processing or storage, and/or may be permanently recorded in a database.

Figure 3:
FIG. 3 is the data entry form of FIG. 2 after it is modified to include revisions to some data values, illustrating how the present invention indicates the data fields in which the modifications have been made.

FIG. 3 illustrates a modified data entry form 100b corresponding to that shown in FIG. 2, but including revisions to some data values. For example, a revised Days To Run data field 104b includes a different numerical value entered by a user. A visual indication of the revision is provided by enlarging a border around the data field and by displaying an icon 130 adjacent to the data field. Alternatively, or in addition, other indicators may be used to notify a user of changes to data values. For example, a revised game name data field 108b may display revised text in italics font or with other text characteristics. Preferably, the revision is also indicated by displaying another instance of icon 130 adjacent to the revised data field. Yet another instance of icon 130 appears adjacent to a revised logo data field 110b. Correspondingly, a revised thumbnail image 112b may be indicated by a blinking border or other graphical technique.

Revisions to nested data may be indicated in equivalent or different ways. For example, a revised version data field 114b may be indicated by an alternate icon 132 displayed adjacent to the data field. Those skilled in the art will recognize that numerous other indicators (visual and otherwise) may be employed to identify revised data fields, and the present invention is not intended to be limited to the specific visual indicators that are discussed herein. Data value text color can be changed to indicate a revision, such as in revised start date data field 116b. Similarly, revised end date data field 118b may display a new background color within the data field to indicate a revised value. A revised form indicator 134 may alternatively or additionally be displayed at a consistent location on the screen whenever content of any data field has changed. In this case, each data field is associated with the revised form indicator. Those skilled in the art will further recognize that animated icons or non-visual indicators may be used to identify revisions to individual data fields, such as audible sounds and tactile feedback sensations supplied through a haptic feedback input device (not shown).

Logic Employed to Implement the Present Invention

Figure 4:
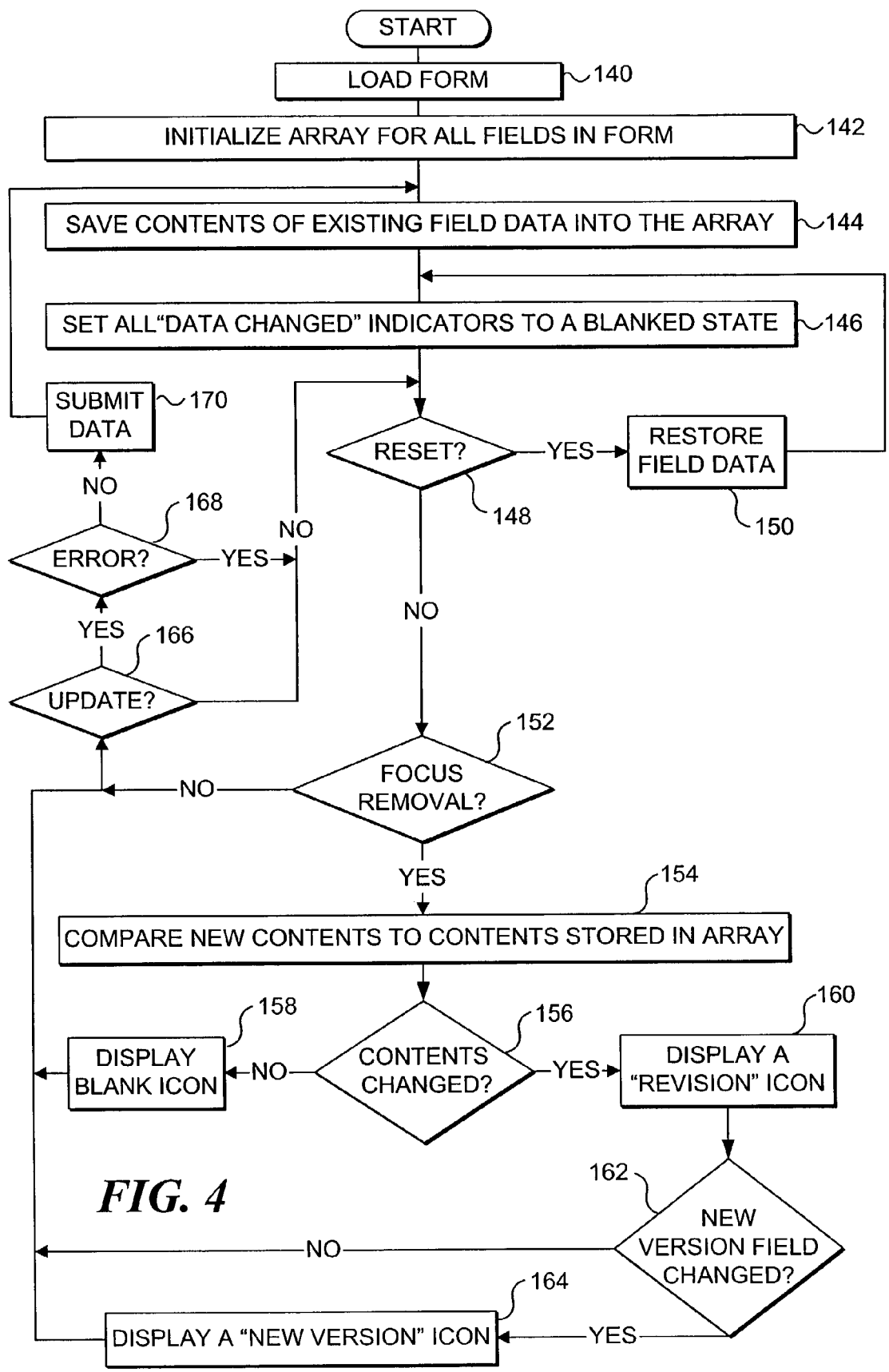
FIG. 4 is a flow diagram illustrating logic for detecting and indicating a revision to content of a data field.

FIG. 4 is a flow diagram illustrating logic for detecting and indicating a revision to content of a data field. At a step 140, a form processing module loads a data entry form into memory. As indicated above, the data entry form may comprise a Web page, database form, text file, or other structure with data fields. Accordingly, the form processing module may be a browser, a browser plug-in, an executable object within the Web page, a database module, a table module of a word processor, or other processing module. At a step 142, the form processing module evaluates the loaded data entry form to determine all data fields that exist in the data entry form and/or that may be revised. Based on this evaluation, the form processing module initializes an array, linked list, or other storage structure for those data fields. Those skilled in the art will recognize that this evaluation is not always required. Data fields may be predefined and known to the form processing module. In that case, the form processing module need only access stored initial content data according to the predefined data fields to compare with newly modified content data. Similarly, if the data entry form represents a new record, the data fields may be known to be blank or set to one or more default content values. However, for some data entry forms, such as a Web page, the data fields may not be known, or it may be more efficient to evaluate the data entry form locally, rather than access a server another time. In that case, the form processing module accesses and stores a copy of existing content data, if any, for those data fields into the array, at a step 144. In any case, at a step 146, the form processing module sets all "data changed" indicators to a blank state. For example, all revision icons are removed from display, all colors are set to initial states (used for non-revised data), etc.

Once the data entry form is initialized and displayed, the form processing module determines, at a decision step 148, whether a user has selected the reset button. If the user has selected the reset button, the form processing module restores the content data of all data fields, at a step 150, to initial values stored in the array. The processing module may alternatively access the initial values from a database or other data store. Control then returns to step 146 to set all "data changed" indicators to a blank state.

If the user has not selected the reset button, the form processing module further determines, at a decision step 152, whether focus has been removed from a data field. For example, the form processing module may detect an ON_BLUR event that indicates that focus was removed from a data field. Those skilled in the art will recognize that other detection means may be employed to determine when editing or changes to a data field are completed. For example, the form processing module could simply check the status of each data field at predefined intervals. As another example, the form processing module may wait for the user to select the refresh button, or other specific user action. If focus removal is not detected, control returns to decision step 148, and the form processing module continues to loop through the above detection steps.

Once focus removal is detected, the form processing module compares the contents of the data field from which focus was removed to the contents stored in the array, at a step 154. Implementation of this step will depend on the type of system being used to implement the present invention. For example, if the present invention is implemented to indicate changes made on Web pages, the comparison step and other steps, may be implemented with JAVA™ Script, VB™ script, ActiveX® controls, applets, or other Web-based processes. Alternatively, if the above comparison step or other steps are implemented for a stand-alone database, a programming language such as C++ may be used to define a program object. Upon comparing the new contents to the stored contents, the form processing module determines, at a decision step 156, whether the contents of the data field have changed. If the contents have not changed, the form processing module sets a data changed indicator to a blanked state, at a step 158, for the selected data field. Blanking out an indicator, such as an icon, may include overwriting a portion of the display with a transparent rectangle, adjusting an alpha display value, or other common technique for clearing a portion of a display. This step accommodates the possibility that the content data of the selected data field was changed and then changed back to its initial value.

If the contents have changed, the form processing module activates a predefined indication of the change at a step 160. For example, the form processing module may display a revision icon adjacent to the changed data field and/or at a consistent predefined location on the electronic data entry form. In addition, or alternatively, a color change, border change, or other indicator may be activated, as discussed above.

The form processing module may also determine, at a decision step 162, whether a nested data field has changed. For example, the form processing module may determine whether the version data field has changed. If the version data field has changed, the form processing module displays the alternate icon, such as a new version icon, adjacent to the changed field, at a step 164. Thus, multiple indications may be activated when a change is made to a nested data field, indicating any changes made to data fields at each level.

Once the new version icon is displayed, or if a nested data revision indicator is not needed, or after the form processing module sets a data changed indicator to a blanked state, the form processing module determines, at a decision step 166, whether the user has selected the update button. If the user has not selected the update button, control returns to decision step 148 as the form processing module awaits another user action. If the user has selected the update button, the form processing module determines, at a decision step 168, whether there is an error with the content data. This error detection may be performed to validate a data type, data length, or other characteristic of content data expected for the data fields. If an error is detected, the form processing module preferably displays an error indicator and returns control to decision step 148 to await another user action. If no error is detected, the form processing module submits the current contents of the data fields to a server or to permanent storage in a database, at a step 170. The submit step may also replace the initial data content of the array with any modified data that may have been previously entered. Once current data is submitted, control returns to step 144 to update the array with the newly submitted data.

Those skilled in the art will recognize that the above process will be repeated if the user selects a new set of data to be displayed in the data entry form. For example, with reference to FIGS. 2 and 3, the user may select a new license number as a control field for accessing a new set of content in the data fields.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer-implemented method for indicating a change to a data field in an electronic data entry form while the electronic data entry form is being modified by a user, the method comprising the steps of:

(a) loading an electronic data form from a database, wherein the electronic data form comprises one or more data entry fields surrounded by borders;

(b) detecting an initial content of a data field as a portion of the electronic data entry form, wherein the initial content comprises the content for the data field when the electronic data form is loaded;

(c) storing the initial content of the data field for future reference;

(d) comparing a current content of the data field with the initial content of the data field, the current content comprising data in the data field that has been changed by user interaction with the data field; and (e) before initiating storage of the current content of the data field to the database, determining that the current content of the data field is different from the initial content of the data field and in response to determining that the content of the data field is different from the initial content of the data field, activating a sensible indicator in the electronic data entry form, wherein the sensible indicator provides an indication in the form of at least one of a visual indicator, an audible sound, or tactile feedback, providing a readily apparent and sensible indication in the electronic data form that the current content of the data field is different from the initial content of the data field, wherein the sensible indicator includes at least one of enlarging a border around the data field or causing the border of the data field to blink, and wherein steps (d)-(e) are performed in response to at least one of:
(i) a removal of focus from the data field;
(ii) an expiration of a predetermined time interval since the data field was previously accessed;
(iii) a transfer of focus to the data field; or
(iv) a selection of a refresh function.

2. The method of claim 1, further comprising the steps of:
(a) determining whether the data field comprises a nested data field that is included in a subset of data related to the data field; and
(b) activating a second indicator that is associated with the nested data field, if the data field comprises a nested data field.

3. The method of claim 1, further comprising the step of deactivating the indicator if at least one of:
(a) a reset function is activated to replace the current content of the data field with the initial content of the data field; or
(b) a submit function is activated to permanently replace the initial content of the data field with the current content of the data field.

4. The method of claim 3, wherein the step of deactivating the indicator comprises the step of overwriting an icon with a blank icon.

5. The method of claim 1, wherein the data field comprises a portion of the electronic data entry form.

6. The method of claim 5, wherein the electronic data entry form comprises at least one of:
(a) a Web page;
(b) a database form; or
(c) a table.

7. The method of claim 1, wherein prior to accessing the initial content of the data field, further comprising the steps of:
(a) loading the electronic data entry form that includes the data field;

(b) detecting the data field within the electronic data entry form; and
(c) detecting the initial content of the data field.

8. A computer-readable medium storing computer-readable machine instructions that cause an electronic device to perform the following steps:
(a) loading an electronic data form from a database, wherein the electronic data form comprises one or more data entry fields surrounded by borders;
(b) detecting an initial content of a data field as a portion of the electronic data entry form, wherein the initial content comprises the content for the data field when the electronic data form is loaded;
(c) storing the initial content of the data field for future reference;
(d) comparing a current content of the data field with the initial content of the data field, the current content comprising data in the data field that has been changed by user interaction with the data field; and
(e) before initiating storage of the current content of the data field to the database, determining that the current content of the data field is different from the initial content of the data field and in response to determining that the content of the data field is different from the initial content of the data field, activating a sensible indicator in the electronic data entry form, wherein the sensible indicator provides an indication in the form of at least one of a visual indicator, an audible sound, or tactile feedback, providing a readily apparent and sensible indication in the electronic data form that the current content of the data field is different from the initial content of the data field, wherein the sensible indicator includes at least one of enlarging a border around the data field or causing the border of the data field to blink,
wherein steps (d)-(e) are performed in response to at least one of:
(i) a removal of focus from the data field;
(ii) an expiration of a predetermined time interval since the data field was previously accessed;
(iii) a transfer of focus to the data field; or
(iv) a selection of a refresh function.

9. A system for indicating a change to a data field in an electronic data entry form, comprising:
a processor;
a display in communication with the processor;
a user input device in communication with the processor; and
a memory in communication with the processor and storing computer-readable machine instructions that cause the processor to perform a plurality of functions including:
(a) loading an electronic data form from a database, wherein the electronic data form comprises one or more data entry fields surrounded by borders;
(b) detecting an initial content of a data field as a portion of the electronic data entry form, wherein the initial content comprises the content for the data field when the electronic data form is loaded;
(c) storing the initial content of the data field for future reference;
(d) comparing a current content of the data field with the initial content of the data field, the current content comprising data in the data field that has been changed by user interaction with the data field; and
(e) before initiating storage of the current content of the data field to the database, determining that the current content of the data field is different from the initial content of the data field and in response to determining that the content of the data field is different from the initial content of the data field, activating a sensible indicator in the electronic data entry form, wherein the sensible indicator provides an indication in the form of at least one of a visual indicator, an audible sound, or tactile feedback, providing a readily apparent and sensible indication in the electronic data form that the current content of the data field is different from the initial content of the data field, wherein the sensible indicator includes at least one of enlarging a border around the data field or causing the border of the data field to blink, wherein steps (d)-(e) are performed in response to at least one of:
  (i) a removal of focus from the data field;
  (ii) an expiration of a predetermined time interval since the data field was previously accessed;
  (iii) a transfer of focus to the data field; or
  (iv) a selection of a refresh function.

10. The system of claim 9, wherein the indicator comprises at least one of:
  (a) an icon displayed adjacent to the data field;
  (b) a change in a border around the data field;
  (c) a change in a font used for the current content of the data field;
  (d) a change in a color of a portion of the data field;
  (e) a periodic variation in a displayed intensity of a portion of the data field; or
  (f) a revised form icon located at a predefined location on the electronic data entry form.

11. The system of claim 9, wherein the machine instructions further cause the processor to perform the functions of:
  (a) determining whether the data field comprises a nested data field that is included in a subset of data related to the data field; and
  (b) activating a second indicator on the display that is associated with the nested data field, if the data field comprises a nested data field.

12. The system of claim 9, wherein the machine instructions further cause the processor to perform the function of deactivating the indicator if at least one of:
  (a) a reset function is activated with the input device to replace the current content of the data field with the initial content of the data field; or
  (b) a submit function is activated with the input device to process the current content of the data field.

13. The system of claim 9, wherein prior to storing the initial content of the data field, the machine instructions further cause the processor to perform the functions of:
  (a) loading into the memory the electronic data entry form that includes the data;
  (b) detecting the data field within the electronic data entry form; and
  (c) detecting the initial content of the data field.

* * * * *